United States Patent [19]

Tsai

[11] Patent Number: 4,626,868

[45] Date of Patent: Dec. 2, 1986

[54] METHOD AND APPARATUS FOR NON-IMPACT PRINTING

[76] Inventor: Irving R. Tsai, 435 E. 70th St., Apt. 16-K, New York, N.Y. 10021

[21] Appl. No.: 700,127

[22] Filed: Feb. 11, 1985

[51] Int. Cl.[4] ..................... G01D 15/14; G03B 27/32; G03G 13/01

[52] U.S. Cl. .................................. 346/1.1; 346/76 L; 355/32; 358/75; 358/300; 403/42; 403/46; 403/901

[58] Field of Search .................... 358/75, 300; 355/32; 430/42, 46, 901; 346/76 L, 1.1

[56] References Cited

U.S. PATENT DOCUMENTS 4,494,865 1/1985 Andrus et al. .................... 355/32 X 4,542,084 9/1985 Watanabe et al. .................... 430/46

FOREIGN PATENT DOCUMENTS 894498 3/1983 Fed. Rep. of Germany ...... 352/244

*Primary Examiner*—E. A. Goldberg
*Assistant Examiner*—Gerald E. Preston
*Attorney, Agent, or Firm*—Davis Hoxie Faithfull & Hapgood

[57] ABSTRACT

The present invention relates to a method and apparatus for non-impact, single-pass printing in which the toner exhibits a selective or "tuned" response to an agent having a preselected characteristic, such as light energy of a particular frequency emitted by a laser, to impart an image to a printing surface or substrate.

20 Claims, 4 Drawing Figures

METHOD AND APPARATUS FOR NON-IMPACT PRINTING

BACKGROUND OF THE INVENTION

1. Field of the Invention

The present invention relates to a method and apparatus for non-impact, single-pass printing in which the toner exhibits a selective or "tuned" response to an agent having a preselected characteristic, such as light energy of a particular frequency emitted by a laser, to impart an image to a printing surface or substrate.

The invention may be applied in systems using a single toner or in systems using multiple toners, such as those designed to generate multi-colored output. It is equally applicable to monochrome printing, whether of the single or multiple toner variety, and to color printing. In one particular kind of monochrome printing according to the invention, toners of varying shades, sizes, or both are used to provide an enhanced gray-scale for generating graphics. The invention is well suited for computer printing, color xerography, and facsimile printing, but is not limited to these.

2. Description of the Prior Art

There are a variety of known, non-impact printing techniques that use a laser to produce color images, or more generally, to produce images formed from a plurality of toners, on untreated substrates. These techniques can be classified into one of two main groups depending on whether a single or multiple pass is required to create the final image. None of these techniques, however, utilizes the selective or tuned response invention disclosed herein.

U.S. Pat. No. 3,780,214 (Bestenreiner et al.), for example, describes a method and apparatus for making color prints by using laser energy to sequentially heat certain portions of a plurality of webs, each of which has a single color pigment applied to it, and then transferring each of these images to the paper substrate so that the transferred image from each just-heated web overlies the transferred image from the ones heated earlier. U.S. Pat. No. 4,148,057 (Jesse) discloses a technique of direct laser printing capable of printing on large or irregularly shaped surfaces, as well as of producing three dimensional objects; also disclosed is a means for producing multi-colored images. The techniques disclosed in both these patents, however, require multiple passes to create polychromatic prints. Moreover, there is no suggestion in either patent of utilizing selectivity of the toner to achieve single-pass printing. East German Pat. No. DL 0155507 (Schlegel), in the abstract the present inventor has seen, describes a telex machine in which a thin layer of ink carrier is applied magnetically or electrostatically to paper, then fused to it at particular points by a laser beam. The disclosure pertains to monochrome printing and does not mention any kind of tuned response behavior by a toner.

SUMMARY OF THE INVENTION

The present invention relates to a system for producing printed images from one or more toners, on untreated substrates, in which the various toners may differ with regard to their color, shading, spot size, texture, or another characteristic or combination of characteristics.

The present invention relates to what might be described as "tuned response printing", in the sense that the materials which impart features to the printing substrate, referred to often as toners, are tuned to match some preselected characteristic of a form of electromagnetic energy, or other agent, produced by a controllable source of such an agent. When a toner is exposed to that preselected characteristic of the agent with which it was designed to match, it imparts its toning feature to the substrate, either directly, or indirectly through some intermediate physical or chemical reaction. The characteristic of the agent from the controllable source functions in selecting the specific type of toner to be printed, whether or not it actually causes the selected toner to print. Considerable freedom for variation is available for reducing the technique to practice.

BRIEF DESCRIPTION OF THE DRAWING

The detailed description of the invention will be made with reference to the accompanying drawings, wherein like numerals designate corresponding parts in the several figures.

DESCRIPTION OF THE PREFERRED EMBODIMENT

Figure 1:
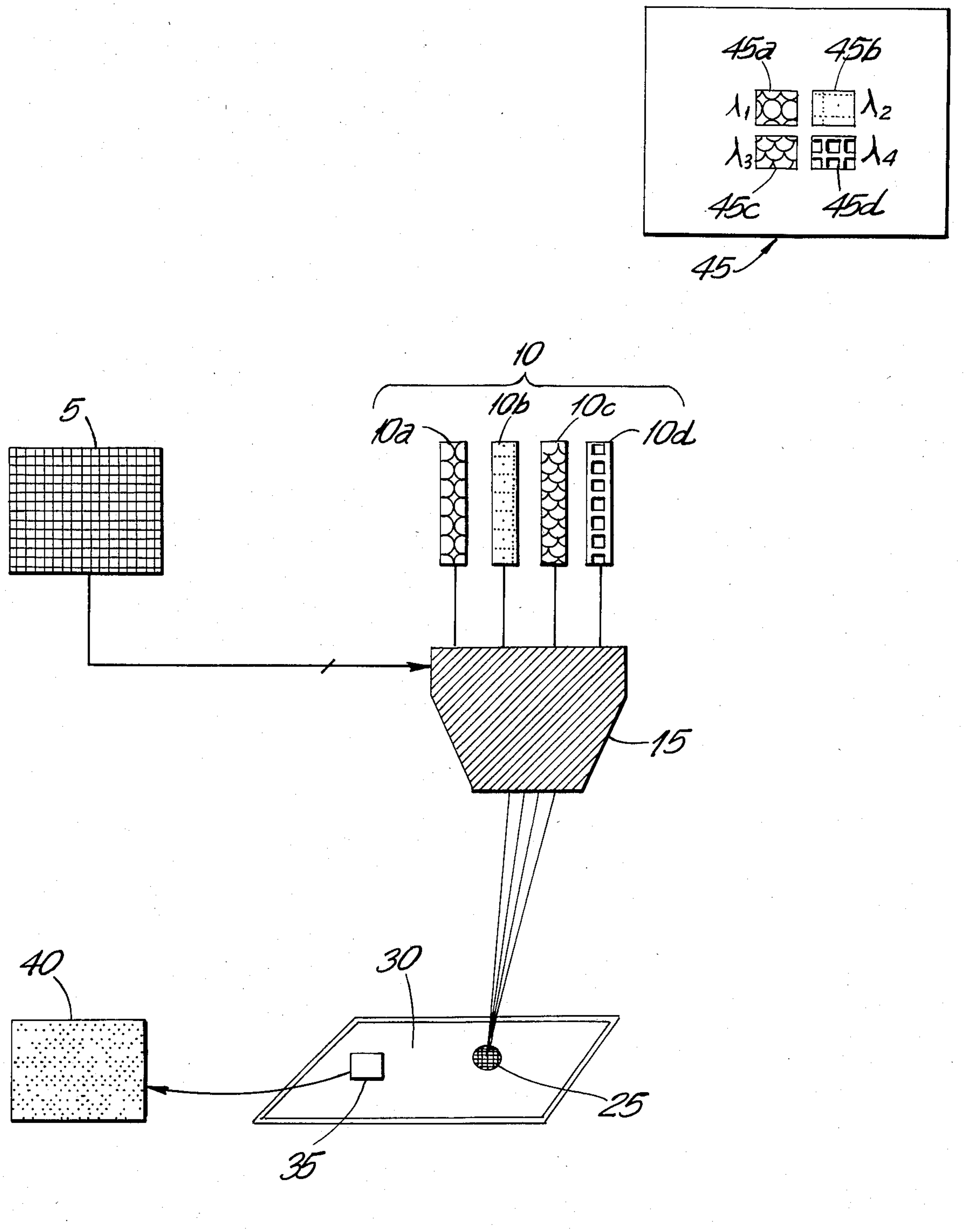
FIG. 1 illustrates one configuration of the preferred embodiment of the present invention.

The following description details the best mode presently contemplated for carrying out the invention. This description is not to be taken in a limiting sense; it is made merely for the purpose of illustrating the general principles of the invention.

The general form of the invention involves one or more controllable sources capable of generating agents having a particular preselected characteristic; one or more different toners evenly applied to a substrate, each toner having a tendency to react only to that agent having the preselected characteristic, and to impart its printing feature in either direct or indirect response to its exposure to that agent; a source for providing a corresponding number of "electrical" write signals representative of the image to be printed; and means associated with the controllable source and the source of the "write" signals for directing the agent having the preselected characteristic to selected sites on the substrate corresponding to the image to be printed, so that the agent only reaches the toner at the selected sites. The controllable sources may produce electromagnetic radiation, electric fields, magnetic fields or other agents which serve either or both of two functions: one function being to select the toner to be printed; another function being to invoke the printing activity of the selected toner, or to bring about its fixation to a substrate, at selected positions, under the control of the means associated with the controllable source and the source of the "write" signals. Where more than one controllable sources are employed, they may produce the same agent or different agents; some controllable sources may function in toner selection, other controllable sources may activate selected toners, or, some or all of the controllable sources may perform both of these functions; these embodiments are all within the scope of the present invention. It is also possible, in another embodiment of the present invention, that one or more of the controllable sources would be directed in diffused fashion at the substrate, for example, to select an area of toner, and would cause a toner reaction in conjunction with another controllable source of another agent, or of the same agent having, or differing in another characteristic. In this last mentioned embodiment, the toner could react only when it receives the two agents simultaneously, or it could react to their sequential receipt.

The source of the "write" signals may be a computer, a facsimile machine, or any device capable of reducing an image into electrical signals, or else of generating electrical signals, perhaps with the aid of a computer, that can be translated to render a meaningful image.

The various toners may differ in either or both of two major ways. First, as already mentioned, they may differ in the feature they impart to the substrate, whether that feature is color, shading, texture, or some other attribute or combination of attributes. Second, they may differ in the particular characteristic to which they respond. Each toner exhibits its own unique response to some preselected characteristic of a particular selection agent. Examples of agents are: electromagnetic radiation, electric fields, or magnetic fields. Examples of characteristics of agents are: wavelength, intensity, duration, polarization or field direction. And examples of preselected characteristics of selection agents are: specific wavelengths or wavebands, specific intensities, or specific field directions. The purpose of the characteristic for selection is to cause the toner to become susceptible to having its printing activity invoked, whether or not the characteristic for selection itself actually invokes such activity. The purpose of the preselected characteristic of the selection agent—for example, the particular wavelength of light—is to provide a means whereby one toner out of a plurality of toners can be selected. In this particular example, the chosen wavelength would select one toner from a group of toners and a separate characteristic or set of characteristics of the agent, for example its intensity and duration, would invoke the printing activity of the selected toner. Selectivity is possible because of the one-to-one correspondence between each preselected characteristic and each toner present.

The selection agent may itself invoke the printing activity of the toner, as described in the previous paragraph, or, it may merely select the toner to be printed. In the latter case, it is the role of the preselected characteristic of the selection agent to select the toner to be printed, and it is the role of a separate characteristic of the same or of a different agent, provided by the same or a separate controllable source, that causes the selected toner to become printed.

The toner can be applied directly to the surface on which the image is desired to appear or to an intermediate substrate. In the latter case, the intermediate substrate serves only in the creation of the image, or in the creation of a partial image, and means must be provided for its transfer to the end-substrate.

Whether printing occurs by the first or the second mechanism mentioned above, the toners may be presented as a pulverulence; as a suspension involving a liquid carrier; as a multi-component liquid in which the toners themselves are in the liquid phase; or bound to a carrier sheet. However, regardless of the actual mechanism of transporting toner to the substrate, and regardless of the sequence in which different toners are transported if they are not all transported simultaneously, it is preferred that all of the different toners be present on, or in close proximity to, the substrate before the commencement of any printing.

While the above description is applicable to a variety of embodiments of the invention, the text which follows will be directed to a description of one particular embodiment of the invention. In this embodiment a multicomponent mixture of toners is applied to a substrate; preferably the substrate on which the image is to reside. The preferred form of the toner is a dry, pulverized emulsion composed of a uniform mixture of all the different toners. The controllable source is one or more lasers, the number to be equal to the number of different toners in the emulsion. Each laser is matched with a specific type of toner, and will only invoke the color imparting activity, or more generally, the feature-imparting activity, of that toner.

Coupling between laser and toner in this embodiment is accomplished through the use of coherent light as the agent, with a preselected wavelength, a particular characteristic of this agent, serving to select the toner. Each laser is tuned to emit light at the wavelength of maximum absorption of its matching toner. Each toner must exhibit a tendency to absorb light of at least one unique wavelength, or light confined to one unique waveband, relative to the other toners present.

FIG. 1 illustrates one configuration of the preferred embodiment of the process. A number of lasers or other coherent light sources are employed, the number being equal to the number of different toners involved. In the present embodiment, there are four different coherent light sources, lasers 10*a*, 10*b*, 10*c*, and 10*d*. As indicated in the legend 45, each coherent source emits light of a different wavelength lambda: 45*a*, 45*b*, 45*c*, and 45*d*. The means for providing the electrical "write" signals representative of the image to be printed, shown as 5, can be a charge coupled device (CCD) imaging assembly with polychromatic capability, a computer, or any kind of device capable of furnishing electrical signals representative of an image. Apparatus 15 is a device, well known to those skilled in the art, for controlling the intensity and diameter of the light emanating from the lasers 10*a–d* and for focussing and deflecting it, in conjunction with the signals from element 5, so that it impinges only on selected sites on the target substrate 30.

A representative region 35 of the substrate, large enough to contain several pixels, is shown enlarged at 40, to illustrate the fact that the toner is present in this configuration as a uniformly distributed mixture of pulverulent material.

Figure 2:
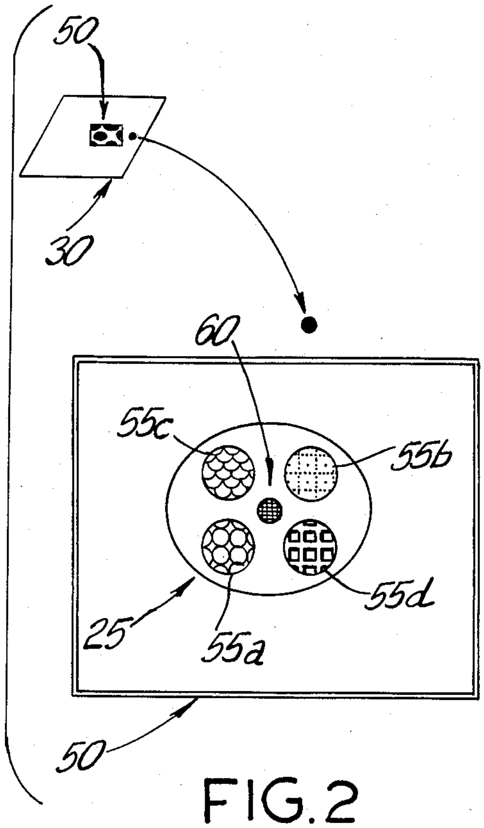
FIG. 2 illustrates one pixel found on the printing surface shown in FIG. 1, in which there is only one particle of each variety of toner present.
Figure 3:
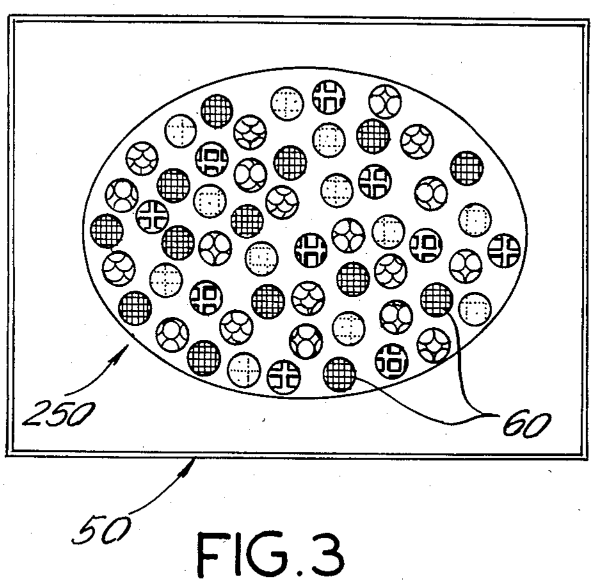
FIG. 3 illustrates another embodiment of a pixel found on the printing surface shown in FIG. 1, in which are found a plurality of particles of each variety of toner.

FIG. 2 shows a small region 50 of the printing surface enlarged to reveal that it contains but one pixel, 25. Within that one pixel are a collection of toner particles 55*a–d*, each particle being of a different toner. Optionally present in the pixel are neutral particles 60. The shading pattern within each particle indicates the correlation between each toner and its matching coherent light source. It should be noted that, in FIG. 2, the enlargement suggests that each pixel 25 contains only one toner particle of each type plus the optional neutral particle. While this may be the case (especially if a carrier sheet is used to transport the toner), the situation depicted in FIG. 3 is more readily put into practice. In FIG. 3 one pixel 250 contains a large number of toner particles. As in FIG. 2 there are four different toner particles present—with each one denoted by a different shading pattern (the same shading convention is used in all figures); also shown are neutral particles. However, the difference is that in FIG. 3 the pixel 250 contains more than just one particle of each type of toner or neutral particle.

Figure 4:
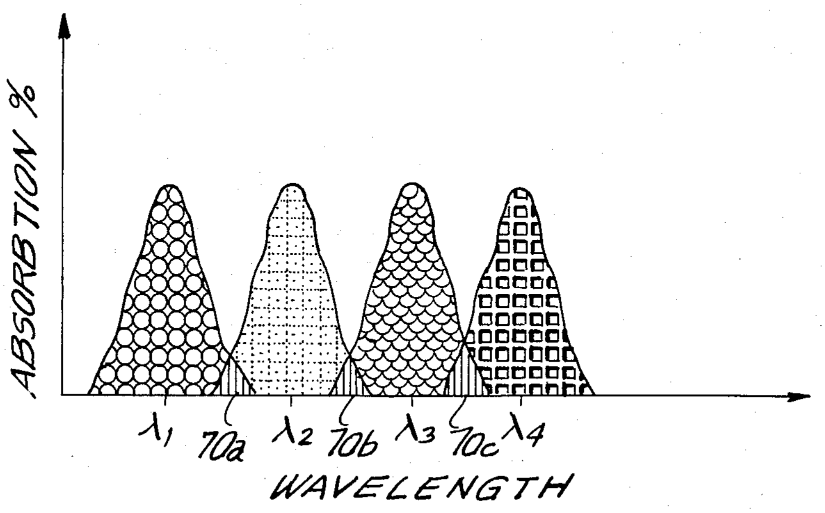
FIG. 4 illustrates an idealized absorption pattern of different toners used in a multiple toner embodiment of the invention.

The graph in FIG. 4 shows an idealization of the absorption patterns of the different toners. There are four peaks, corresponding to the four different toners present. For the first peak, maximum absorption occurs at a wavelength equal to lambda-1, which by design also corresponds to the wavelength of light emitted by laser 10*a*. Similarly, the second, third, and fourth peaks attain maximum absorption at wavelengths lambda-2, lambda-3, and lambda-4 respectively; corresponding to lasers 10*b*, 10*c*, and 10*d* respectively. While in FIG. 4 there is a small amount of overlap between the absorption curves of some of the toners, labelled 70*a*, 70*b*, 70*c*, in the most desirable situation there is no overlap between any two curves. As will be apparent from FIG. 4, the important aspect is that each toner have a tendency to absorb light having a preselected wavelength and to impart its printing feature in response to that absorption. While in this embodiment the toner absorbs the agent: light, from the controllable source, absorption is not a necessary form of reaction of the toner to the agent.

The compound actually responsible for imparting color to a particular toner need not be the one with which the controllable source is tuned. To this end, non-staining or non-color-imparting accessory pigments can be incorporated into each toner particle so as to confer unique, as well as convenient, absorption properties to the toner.

The function of each coherent light source is to provide radiant energy that is selectively absorbed by the particular toner that matches the particular source. The energy absorbed may be transformed into heat, resulting in a change in phase of the toner, such as liquefaction; or, it may result in the sublimation of a part of the original particle, thereby freeing other constituents of the original particle to become deposited; or, it may induce a change in the permeability of that part of the particle which serves as a matrix, and allow other components, such as pigments or dyes, to escape; or, it may bring about other chemical or physical reactions, or alterations in the material state of being of the toner, permitting colorant or other substances carried in, or a part of the toner particle to become formed or deposited on the printing surface.

Single pass printing can take place in two ways. Each pixel can be simultaneously irradiated by all of the coherent light sources whose "write" signal indicates that a particular toner, or no toner, should be printed in that pixel. Or, within a given pixel, each of the toners which should be activated (caused to print) can be activated sequentially. After all of the toners whose activation is required in order to bestow the pixel with its intended qualities have been activated, the steps repeat for the next pixel. The choice of which way to effect printing would depend on numerous factors within the skill of persons skilled in the art to determine. The choice would affect the particular arrangement between the controllable source, the means for providing electrical signals representative of the image, and the means associated with both of these means for directing the agent from the controllable source, in ways well known to those skilled in the art.

In some instances it may be desirable to reduce the number of coherent light sources so that there are fewer of them than there are different toners. Single-pass printing of the sequential type will more suitable in such instances, although multi-pass printing can always be resorted to. To use fewer coherent light sources than toners, some means must be provided for shifting the wavelength of some or all of the coherent sources present. In the extreme, there may be just a single coherent light source. This could be the case either where the wavelength of that source was adjustable, or where, as in many cases of monochromatic printing, only one toner was being used.

Neutral particles, that is, particles devoid of the capacity to impart any kind of feature to the substrate, may also be included in the toner emulsion. Neutral particles may serve a role as a spacer between toner particles, and help to control spacing between printed spots on the surface. In certain embodiments, neutral particles may also serve to lessen interparticulate heat transfer that might otherwise cause unintentional toner activation.

An enhanced form of monochrome printing is also afforded by the process. In this application the different toners differ not in their ability to impart different colors to a substrate, but rather, in their ability to impart different shades of a particular color. The technique is in other respects the same. Yet another variation on the central theme involves creating different textural qualities on the printing surface, whether in addition to, or apart from, other features such as color or shading. Textural quality can be controlled, for example, by the use of toners with varying degrees of viscosity at the time they tack on to the substrate. Still another possibility is to employ toners which when caused to print, print spots of different sizes or shapes. These last mentioned features may be desirable in graphics applications.

The presently disclosed embodiments are therefore to be considered in all respects as illustrative and not restrictive. The scope of the invention is indicated by the appended claims, rather than the foregoing description, and all changes which come within the meaning and range of equivalency of the claims are therefore intended to be embraced therein.

I claim:

1. Apparatus for non-impact printing on an untreated substrate containing a plurality of pixels of a toner mixture comprising:

(a) first means for providing electrical signals representative of the image to be printed;

(b) at least one controllable source of an agent having at least one preselected characteristic;

(c) a multi-component mixture of toner particles, each component toner particles in the mixture having a tendency to impart its printing feature in response to exposure only to an agent having a particular preselected characteristic different from the preselected characteristic of each other component toner particle, the mixture also including neutral particles that serve other than to impart a printing feature;

(d) a substrate having a substantially continuous surface, all portions of any given region of which are simultaneously visible to the controllable source;

(e) the mixture being substantially uniformly applied over the substrate so that each pixel on the substrate contains at least one particle of each toner component and at least one neutral particle;

(f) means associated with the first means and the controllable source means for directing an agent having the preselected characteristic from the controllable source to selected pixels on the substrate corresponding to the image to be printed.

2. Apparatus as described in claim 1 wherein at least one controllable source is a laser, the agent is light and the preselected characteristic is its wavelength.

3. Apparatus as described in claim 1, wherein the controllable source consists of a frequency-adjustable laser.

4. Apparatus as described in claim 2 wherein the toner absorbs at least a significant portion of the light.

5. Apparatus as described in claim 1 wherein the toner imparts its printing feature directly in response to the exposure.

6. Apparatus as described in claim 1 wherein the toner imparts its printing feature indirectly in response to the exposure.

7. Apparatus as described in claim 1 wherein a first agent having a first preselected characteristic causes the toner to be selected and a second agent having a second preselected characteristic causes the toner to impart its printing feature.

8. Apparatus as described in claim 1 wherein each image pixel on the substrate contains a plurality of toner particles.

9. Apparatus as described in claim 3 wherein each image pixel on the substrate contains a plurality of toner particles.

10. Apparatus for non-impact printing on an untreated substrate containing a plurality of pixels of a toner mixture comprising:

(a) first means for providing electrical signals representative of the image to be printed;

(b) at least two controllable sources of agents, each agent having at least one different preselected characteristic;

(c) a multi-component mixture of toner particles, each component toner particles in the mixture having a tendency to impart its printing feature in response to exposure only to agents having all of the different preselected characteristics, the mixture also including neutral particles that serve other than to impart a printing feature;

(d) a substrate having a substantially continuous surface, all portions of any given region of which are simultaneously visible to the controllable source;

(e) the mixture being substantially uniformly applied over the substrate so that each pixel on the substrate contains at least one particle of each toner component and at least one neutral particle;

(f) means associated with the first means and the controllable source means for directing the agents having the preselected characteristics to selected pixels on the substrate corresponding to the image to be printed.

11. Apparatus as described in claim 10 wherein the toner imparts its printing feature in response to sequential exposure to each of the agents.

12. Apparatus as described in claim 10 wherein the toner imparts its printing feature only in response to simultaneous exposure to all of the agents.

13. Apparatus as described in claim 10 wherein each image pixel on the substrate contains a plurality of toner particles.

14. Apparatus as described in claim 10 wherein each controllable source is a laser, the agent is light, and each different preselected characteristic is a wavelength.

15. Apparatus for non-impact printing on an untreated substrate containing a plurality of pixels of a toner mixture comprising:

(a) first means for providing electrical signals representative of the image to be printed;

(b) at least two controllable sources of agents, each agent having at least one different preselected characteristic;

(c) a multi-component mixture of toner particle, each component toner particle in the mixture having a tendency to impart its printing feature in response to exposure only to agents having all of the different preselected characteristics, the mixture also including neutral particles that serve other than to impart a printing feature;

(d) a substrate having a substantially continuous surface, all portion of any given region of which are simultaneously visible to the controllable source;

(e) the mixture being substantially uniformly applied to the substrate so that each pixel on the substrate contains at least one particle of each toner component and at least one neutral particle;

(f) means associated with the first means and the controllable source means for directing a first of the agents having a first different preselected characteristic from the controllable source in diffuse fashion to the substrate and for directing a second of the agents having a second different preselected characteristic to selected pixels on the substrate corresponding to the image to be printed.

16. Apparatus as defined in claim 15 wherein the toner imparts its printing feature in response to simultaneous exposure to all of the agents.

17. Apparatus as defined in claim 15 wherein the toner imparts its printing feature in response to sequential exposure to each of the agents.

18. Apparatus as defined in claim 15 wherein at least one controllable source is a laser, the agent produced by that source is light, and the preselected characteristic is wavelength.

19. A method for non-impact printing on an untreated substrate containing a plurality of pixels of a toner mixture and having a substantially continuous surface all portions of any given region of which are simultaneously visible to a controllable source, the substrate having applied thereon a multi-component mixture of toner particles, each component toner particle in the mixture having a tendency to impart its printing feature in response to exposure only to an agent having a particular preselected characteristic different from the preselected characteristic of each other component toner particle, the mixture also including neutral particles that serve other than to impart a printing feature, the mixture being substantially uniformly applied over the substrate so that each pixel on the substrate contains at least one particle of each toner component and at least one neutral particle:

(a) providing at least one controllable source of an agent having at least one preselected characteristic;

(b) providing a first means for providing electrical signals representative of the image to be printed;

(c) controlling the controllable source means in accordance with the electrical signals from the first means to direct the agent having the preselected characteristic from the controllable source to selected pixels on the substrate corresponding to the image to be printed.

20. Apparatus as described in claim 1 wherein the printing feature imparted by the toner is a textural quality.

* * * * *